United States Patent [19]

Lichti

[11] Patent Number: 4,634,572
[45] Date of Patent: Jan. 6, 1987

[54] SYSTEM FOR AUTOMATICALLY CONSOLIDATING A PLURALITY OF BODIES FORMED OF POWDER

[75] Inventor: Robert D. Lichti, Signal Hill, Calif.

[73] Assignee: Metal Alloys, Inc., Irvine, Calif.

[21] Appl. No.: 664,544

[22] Filed: Oct. 25, 1984

[51] Int. Cl.[4] .............................................. B22F 3/12
[52] U.S. Cl. ...................................... 419/44; 419/49; 419/57; 419/55; 419/68; 425/383; 425/387.1; 425/405 H; 425/DIG. 38; 72/419; 72/426
[58] Field of Search ............ 425/110, 112, 383, 387.1, 425/405 H, DIG. 38; 419/31, 57, 49, 68, 44, 55; 72/419, 426

[56] References Cited

U.S. PATENT DOCUMENTS

| | | | |
|---|---|---|---|
| 3,689,259 | 9/1972 | Hailey | 419/49 X |
| 3,992,202 | 11/1976 | Dulis et al. | 419/49 X |
| 4,359,336 | 11/1982 | Bowles | 419/49 |
| 4,499,049 | 2/1985 | Hanejko | 419/49 |
| 4,501,718 | 2/1985 | Bradt | 419/49 |

Primary Examiner—Stephen J. Lechert, Jr.
Attorney, Agent, or Firm—Spensley Horn Jubas & Lubitz

[57] ABSTRACT

A system for automatically consolidating a plurality of metallic or ceramic (or mixtures thereof) powder preforms is disclosed. The system comprises an assembly container wherein a consolidation container is filled with hot consolidation particles for facilitating the consolidation, and a hot preform to be consolidated thereby. The atmosphere of the assembly container is maintained hot and inert or reducing during assembly of the consolidation charge. Further disclosed are means for automatically delivering the consolidation containers, consolidation particles and preforms to the assembly container. The system includes means for conveying the consolidation containers to a press for consolidation, for separating the containers from the consolidation particles and consolidated preform after pressing, and for recycling the consolidation particles and consolidation containers. The system can be run by suitable logic control on a continuous basis allowing for the automatic consolidation of a plurality of preforms to thereby produce a plurality of consolidated articles of manufacture.

6 Claims, 2 Drawing Figures

U.S. Patent   Jan. 6, 1987   4,634,572
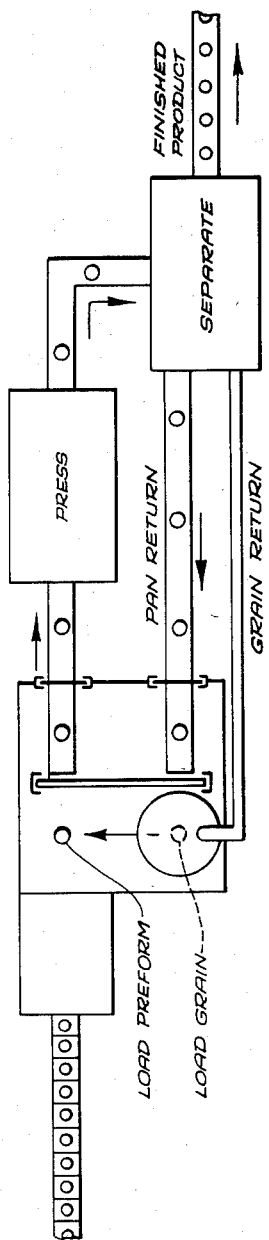
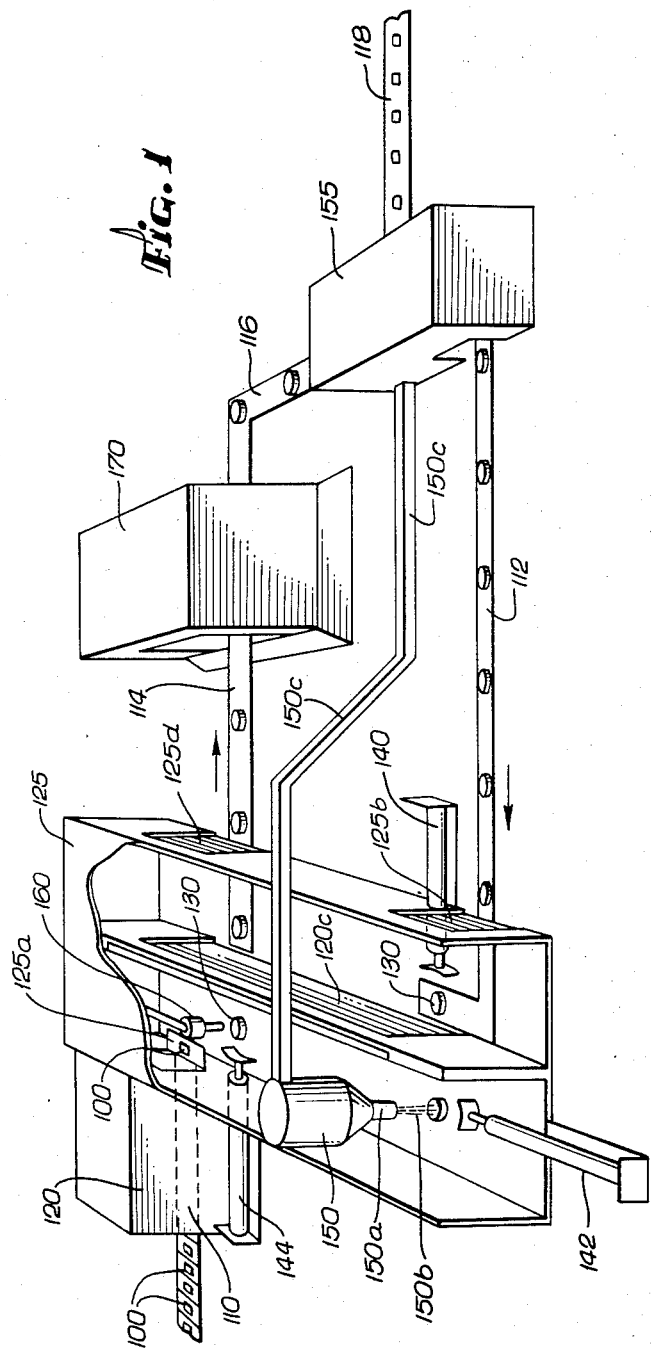

SYSTEM FOR AUTOMATICALLY CONSOLIDATING A PLURALITY OF BODIES FORMED OF POWDER

BACKGROUND OF THE INVENTION

1. Field of the Invention

This invention relates to the field of powder consolidation and more specifically, to a system for automatically consolidating a plurality of bodies or preforms formed of metallic or ceramic powder (or mixtures thereof) to thereby produce a plurality of consolidated articles of manufacture.

2. Prior Art

Methodology associated with producing high density metallic objects by consolidation is recognized in the prior art. Examples of prior art references which discuss such methodology are U.S. Pat. Nos. 3,356,496 and 3,689,259. Methodology specifically related to the present invention can be found discussed in U.S. application Ser. Nos. 469,100, 469,101, and 469,102, now U.S. Pat. Nos. 4,499,048, 4,499,049, and 4,501,718, respectively, all assigned to Cooper Industries. The detailed description of the invention portion of the latter three applications and patents being incorporated into this application by reference.

In general, the latter three patents are directed to a method of consolidating a body or preform formed of metallic or ceramic powder to thereby produce a consolidated article of manufacture. The method, known as the "Ceracon Process", generally comprises the steps of:

(a) forming a body or "preform" from powdered metal or ceramic into a desired configuration;

(b) embedding the preform in a hotbed of generally spheroidal consolidation particles thereby forming a hot consolidation charge; and (c) compacting the hot consolidation charge under pressure to thereby consolidate the preform into a dense shape of the desired configuration, for example, a wrench.

To implement the consolidation methodology discussed above on a cost efficient, large scale basis requires an automated assembly system which can process a large number of preforms with a minimal amount of human labor. The means for handling hot consolidation particles, hot articles of manufacture and hot preforms if done manually, obviously is tedious work and can result in an inefficient operation.

Robots are known which can efficiently move hot objects in a variety of directions within a container. See U.S. application Ser. No. 648,073, assigned to Cooper Industries.

It is therefore an object of the present invention to automate the process of consolidating a plurality of bodies or preforms formed of metallic or ceramic powder (or mixtures thereof) to thereby automatically produce a plurality of consolidated articles of manufacture.

SUMMARY OF THE INVENTION

The present invention is directed to a system for consolidating bodies or preforms formed of metallic or ceramic powder (or mixtures thereof) on a mass production scale level. The consolidation method is the Ceracon Process discussed previously and preferably comprises embedding a hot body or preform formed of the chosen powder in a desired configuration in a bed of hot consolidation particles and then compacting the embedded preform under high pressure to thereby form a consolidated article of manufacture.

The system includes an assembly container for assembling a hot consolidation charge for subsequent high pressure compaction. The consolidation charge includes a consolidation container or a cylindrical can having a cavity for holding a predetermined amount of hot consolidation particles and a hot preform. The assembly container includes means for delivering the predetermined amount of hot consolidation particles to the consolidation container thereby to form a hotbed of consolidation particles and means for embedding a preform in the hotbed of consolidation particles. The embedding means preferably is able to move the preform in a variety of precise directions inside the assembly container without significantly disturbing the temperature and atmospheric conditions within the container. The atmosphere inside the assembly container is maintained sufficiently hot and inert or reducing to successfully implement the Ceracon Process. To maximize the rate of assembling consolidation charges, the preform and consolidation particles are delivered to the assembly container under temperature and atmospheric conditions similar to that inside the assembly container.

The system can also include several transport means for transporting preforms, consolidation particles and consolidation containers to the assembly container; means for transporting consolidation charges to the press; means for separating the consolidation container, consolidation particles and consolidated metallic or ceramic body after consolidation; and means for transporting separated recycled consolidation containers and separated consolidation particles to the assembly container.

The system is designed to be operated on a continuous automated basis by suitable logic control. As a result, the system is capable of automatically consolidating a plurality of preforms at a very high production rate, with low production and labor costs, and with a concomitant efficient recycling of the consolidation particles and consolidation containers.

DESCRIPTION OF THE DRAWINGS

FIG. 1 is a diagrammatic top view of one embodiment of the present invention; and FIG. 2 is a side perspective view of the embodiment shown in FIG. 1.

DETAILED DESCRIPTION OF THE INVENTION

The present invention is directed to a system for automatically consolidating a plurality of bodies or preforms formed of metallic or ceramic (or mixtures thereof) powder to thereby produce a plurality of consolidated articles of manufacture. In general, the system of the present invention utilizes the method and process discussed in U.S. application Ser. Nos. 469,100, 469,101 and 469,102, now U.S. Pat. Nos. 4,499,048, 4,499,049, and 4,501,718, respectively, all assigned to Cooper Industries. In general, these patents are directed to a method or process of consolidating a body or preform formed of metallic or ceramic powder thereby to produce a consolidated article of manufacture. The method, known as the "Ceracon Process" generally comprises the steps of:

(a) forming a body or "preform" from powdered metal or ceramic into a desired configuration;

(b) embedding the preform in a hotbed of generally spheroidal consolidation particles thereby forming a hot consolidation charge; and (c) compacting the hot consolidation charge under pressure to thereby consolidate the preform into a dense shape of the desired configuration, for example, a wrench.

Referring to FIGS. 1 and 2, one embodiment of the present invention is shown. Initially, a plurality of bodies are formed of metallic (or ceramic) powder or "preforms" 100 are made, for example, in the shape of wrenches. The preforms 100 can be prepared by any technique, for example, hard die pressing, cold isostatic pressing, injection molding, etc. While the preferred embodiment contemplates the use of a metallic preform made of powdered steel particles, other metals or ceramics or mixtures thereof are also within the scope of the Ceracon Process and may be employed in the system of the present invention.

A preform typically is about 80 percent of theoretical density. After the metal powder has been formed into a desired shape, the preform can be sintered to increase its strength. In the preferred embodiment, the sintering and the preform preheating for consolidation are done simultaneously. A steel preform requires processing temperatures in the range of about 1,700° to 2,300° F. for a time of about 2–30 minutes in a protective or reducing atmosphere. However, as will be appreciated, the temperature and atmosphere for processing preforms in the system of the present invention may vary depending on factors such as the consolidation particle type, production rate and consolidation temperature.

After the preforms 100 are prepared as generally discussed above, the preforms 100 are unloaded by a loading robot (not shown) from a preform pallet (not shown) and placed on a first transport or preform conveyor 110 which brings the preforms 100 through preheating container 120 to assembly container 125. The first preform transport conveyor 110 can be, for example, a conveyor of the walking beam type. The inside of the preheating container 120 and the assembly container 125, are maintained at a desired temperature and atmosphere, for example, temperatures of about 1900°–2300° F. with a controlled atmosphere consisting of, for example, about 95% nitrogen, 5% hydrogen. The atmosphere and temperature within these containers is maintained controlled by methods well known in the art. The preform conveyor 110 brings the preforms 100 to assembly container inner shelf 125a where a preform is positioned for further processing as discussed below.

As discussed previously, the atmosphere of the preheating container 120 and assembly container 125 are maintained sufficiently reducing or inert to implement the consolidation process utilized. For steel preforms, the atmosphere is generally nitrogen based, and preferably 95% $N_2$ and 5% $H_2$. The atmosphere and temperature generally depend upon the material makeup of the preforms, the consolidation pressure and the consolidation particles. That is, consolidation takes place by subjecting the preform to high temperature and pressure. For metal (steel) preform objects, temperatures in the range of about 2,000° F. and uniaxial pressures of about 40 tons per square inch ("TSI") are used. Using silica ceramic consolidation particles at a consolidation temperature of approximately 2000° F. will require higher pressure to achieve densification when compared with using alumina ceramic consolidation particles at the same temperature. In any event, for steel preforms, spheroidal alumina ceramic particles is preferred over silica particles up to temperatures of 2200° F., and carbonateous spherical particles are preferred over both.

A second transport conveyor 112 brings a consolidation container, for example, a cylindrical tray or pan 130 from separator 155 (discussed further below), through a sliding door 125b, and adjacent to the sliding door 120c. A pusher, preferably a hydraulic pusher, 140 pushes the pan 130 through the door 120c so that the pan 130 is aligned in position under valved delivery tube 150a of consolidation particle heating and storage container 150. A predetermined amount of hot consolidation particles 150b is delivered through the delivery tube 150a to pan 130 to thereby form a hotbed of consolidation particles. The consolidation particles are maintained heated to about the temperature, and under an inert or reducing atmosphere, such as dry nitrogen, inside container 150. The system is designed to recycle the consolidation particles as discussed below, with the particles maintaining minimal heat loss during recycling.

Pusher 142 delivers the pan 130 (containing the hot consolidation particles 150b) to a position aligned between pusher 144 and consolidation charge conveyor 114. A robot 160 picks up the hot preform 100 and places the preform 100 at a desired level within the consolidation particles inside the pan 130 thereby forming a hot consolidation charge. The robot 160 can be of a variety of types adapted to move hot articles in various directions within the inside of a container having a hot controlled atmosphere. Preferably the robot 160 is of the type described in U.S. application Ser. No. 648,073, assigned to Cooper Industries. In general, robot 160 is of the type that can pick up an object from one location in a closed container and precisely place it at another location in the container, with all such movements of the robot arm not materially affecting the atmosphere inside the container.

After the pan 130 is loaded with hot preform and hot particles as discussed above, pusher 144 pushes the hot consolidation charge through the sliding door 120c onto the consolidation charge conveyor 114. It should be appreciated that preferably as pusher 140 pushes an empty pan 130 through the sliding door 120c, pusher 144 simultaneously pushes a consolidation charge through the sliding door 120c. As a result of such simultaneous movement, loss of heat and atmosphere control within the assembly container 125 during assembly is minimized.

After the consolidation charge is placed on the consolidation charge conveyor 114, the sliding door 125d opens thereby allowing conveyor 114 to bring the hot consolidation charge to the press 170 without interruption. The press 170 contains a press die (not shown) having a cavity which can receive the consolidation charge. After the press die is loaded with the consolidation charge, the press 170 is operated to thereby form a consolidated article of manufacture. The press 170 operation to consolidate includes axial motion of a press ram or punch (not shown) into the press die cavity to pressurize the consolidation particles thereby to transfer pressure to consolidate the preform.

After consolidation in the press, the loaded pan 130 is released from the press die and is brought by conveyor 116 to separator 155. Separator 155 functions to separate the consolidated product, consolidation particles and pans. The consolidated products are placed upon the product conveyor 118 for delivery to a further processing area, the empty pans are placed upon the pan return conveyor 112 for reuse, and the consolidation particles are returned by the return particle transport means 150c to the particle storage and heating container 150 also for reuse. The product conveyor 118 can transport the finished consolidated articles to a station (not shown) for cooling, annealing, heat treating or other processing that may be required before inspection and shipping.

Several dozen pressure, heat and motion sensors can be strategically located throughout the system feeding information to a computer for on-line monitoring of all stages of production by suitable logic control. Warning systems, colorgraphic displays, automatic shutdown for maintenance and several other computerized functions can be suitably programmed into the computer. The present invention thus implements preform consolidation on an automated, highly efficient basis. The system allows for the production of a plurality of near-net-shape parts, reduces machining needs, can produce complex part shapes, has low labor costs, recycles consolidation particles and easily allows separation of consolidated products from the consolidated particles therefore yielding low cost in manufacturing.

The system operations can be timed to deliver a large volume of consolidated articles of manufacture onto the product conveyor 118. Depending on preform size and press capacity, more than one preform may be consolidated simultaneously. The total assembling, pressing and separating cycle (discussed above) is preferably only seconds in length.

While a particular embodiment of the present invention has been described, it will be apparent to those skilled in the art that other embodiments are clearly within the scope of the present invention. For example, the pan 130 or the press die may be loaded with several preforms to further increase production capacity. Further, the transport and delivery means can vary within the realm suitable to accomplish the desired purpose. This invention, therefore, is not intended to be limited to the particular embodiments herein disclosed.

What is claimed is:

1. A system for automating the consolidation of a plurality of bodies formed of metallic or ceramic powder or mixtures thereof to thereby produce a plurality of consolidated aticles of manufacture, the system employing a process wherein pressure is applied to a particulate medium which has embedded within an article preform formed of said powder, the preform being shaped in a desired configuration, the system comprising:
    a consolidation container having a cavity;
    an assembly container having a hot atmosphere which is maintained reducing or inert during operation of the system, the assembly container including means for delivering a predetermined amount of particulate medium to the consolidation container cavity and means or embedding a preform in the predetermined amount of particulate medium thereby to form a consolidation charge including the container, preform and particulate medium;
    means for bringing a preform and a consolidation container to the inside fo the assembly container; and
    means for bringing the consolidation charge to a press where the preform is consolidated thereby to form a consolidated article of manufacture.

2. A system according to claim 1, further including means for heating the preform to about the temperature of the assembly container before said preform is brought into the assembly container for loading into the consolidation container.

3. A system according to claim 1, further provided with a particulate medium heating and storage container coupled to the assembly container for heating the particulate medium to a predetermined temperature prior to delivery of the particulate medium to the consolidation container.

4. A system according to claim 3, wherein there is provided means for separating the particulate medium, consolidation containers and consolidated article of manufacture after pressing and wherein there is provided means for recycling the separated particulate medium and consolidation containers.

5. A system for automatically delivering a plurality of bodies formed of metallic or ceramic powder or mixtures thereof to a press for consolidation to produce a plurality of consolidated articles of manufacture, the system comprising:
    an assembly container wherein a consolidation charge is assembled, the consolidation charge including a consolidation container loaded with a predetermined amount of particulate medium and at least one body to be consolidated, the assembly container having a heated and substantially inert or reducing atmosphere during assembly of the consolidation charge;
    a particulate medium storage container for heating and storing particulate medium;
    particulate medium delivery means connected to the particulate medium storage container for delivering a predetermined amount of particulate medium from the particulate medium storage container to the consolidation container;
    first body delivery means for delivering a heated body to be consolidated to a first location inside the assembly container;
    second body delivery means for delivering the hot body from the first location inside of the assembly container to the inside of the consolidation container after operation of the particulate medium delivery means so that the body to be consolidated is embedded in the particulate medium to form a consolidation charge; and
    consolidation charge delivery means for delivering the assembled consolidation charge to the press.

6. A process for automating the consolidation of a plurality of bodies preformed from metallic or ceramic powder or mixtures thereof, each preform prior to consolidation having less than theoretical maximum density, the process comprising the steps of:
    (a) feeding preforms into a first heating container for heating the preforms to a predetermined temperature;
    (b) heating particulate medium in a medium storage container to approximately the predetermined temperature;
    (c) feeding the heated preforms resulting from step (a) into an assembly container for loading medium and preforms into a consolidation container, the assembly container internally heated to the predetermined temperature and having a substantially inert or reducing atmosphere;
    (d) feeding consolidation containers for holding a preform embedded in a predetermined amount of the particulate medium into a second heating container for heating the consolidation containers to a predetermined temperature;

(e) feeding the heated consolidation containers resulting from step (d) into the assembly container;
(f) feeding a predetermined amount of heated particulate medium resulting from step (b) into the consolidation containers fed into the assembly container;
(g) transferring a heated preform located in the assembly container to the consolidation container resulting from step (f) in the assembly container so that the preform is covered by the medium thereby forming an assembled charge;
(h) transferring the assembled charge to a press;
(i) pressurizing the assembled charge in the press to consolidate the preform thereby to form a consolidated article of manufacture;
(j) separating the consolidation container, particulate medium and consolidated article of manufacture;
(k) transferring the particulate medium resulting from step (j) to the medium storage container; and
(l) transferring the consolidation container resulting from step (j) to the second heating container.

* * * * *